Sept. 21, 1948.  J. W. MELANSON  2,449,814
SAW SET
Filed Feb. 28, 1947

Inventor
Joseph W. Melanson
by
H. S. Dennison
atty.

Patented Sept. 21, 1948

2,449,814

UNITED STATES PATENT OFFICE 2,449,814

SAW SET

Joseph W. Melanson, Toronto, Ontario, Canada

Application February 28, 1947, Serial No. 731,561
In Canada April 6, 1946

2 Claims. (Cl. 76—69)

This invention relates to improvements in devices for setting the teeth of saws and the principal object of the invention is to provide a simple form of tool which may be easily and quickly manipulated to effectively and accurately set the angular position of the saw teeth.

A further object is to devise a tool which can be easily operated with one hand and which will ensure the uniform setting of the teeth of a saw.

The principal feature of the invention consists in the novel construction of a jaw-like member adapted to receive the toothed edge of the saw and having a handle for holding and guiding the same, there being a transverse guideway intersecting the opening of the jaw member in which a slidable block or bolt is mounted and is provided with a bevelled surface to engage the teeth of the saw, the said bolt being manipulated by a pivoted hand lever engaging a notched surface in the slidable member.

In the accompanying drawings

Figure 1:
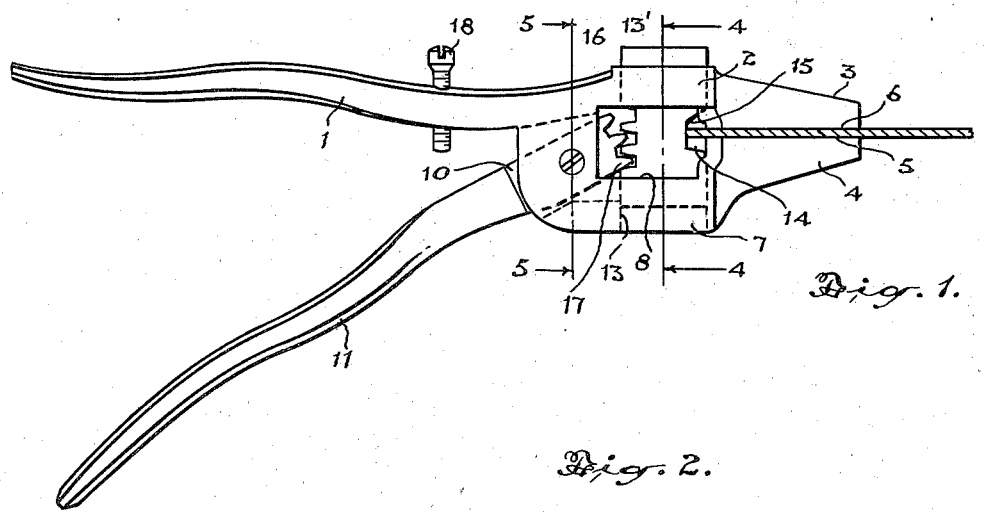
Figure 1 is a side elevational view of my improved saw set showing the saw blade inserted between the jaws and the tooth-setting members in their open position.
Figure 2:
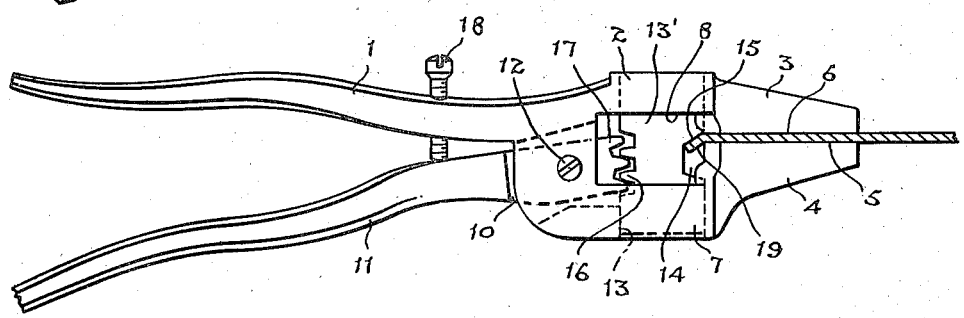
Figure 2 is a side elevational view of the saw set showing the tooth-setting members in their operative position engaging the tooth of the saw in the bent or set position.
Figure 3:
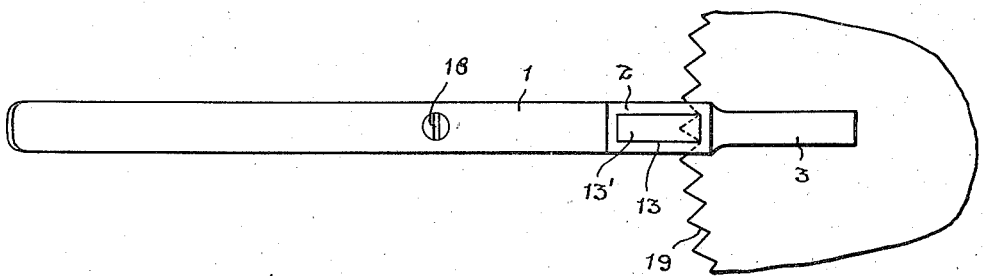
Figure 3 is a plan view of the saw set.
Figures 4, 5:
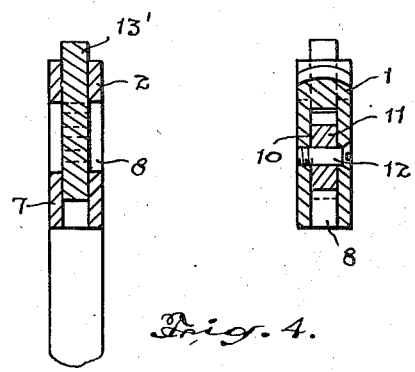
Figure 4 is a vertical sectional view through the saw set taken on the line 4—4 of Figure 1.
Figure 5 is a vertical sectional view taken on the line 5—5 of Figure 1.

Referring to the accompanying drawings, it will be seen that the handle 1 is formed with an upper rectangular portion 2 and an upper jaw member 3 extending from the end of the portion 2 remote from the handle.

A similar jaw 4 is arranged with its upper face 5 parallel with and spaced from the lower surface 6 of the jaw 3, and this jaw member 4 is formed integral with a rectangular portion 7 similar to the portion 2, there being a rectangular opening 8 spacing the members 2 and 7 apart.

The member 7 is also formed integral with the handle 1 and is formed with a vertical slot 9 midway of its width and in this slot 9 is pivotally mounted the flat end portion 10 of the lower handle 11 of the instrument, a pivot screw 12 extending through the side wall.

Slidably mounted within the rectangular orifices 13 in the aligned rectangular portions 2 and 7 is a block 13' which is formed with a notch 14 in its forward edge, the upper edge of which forms a bevelled anvil 15 which is adapted to engage the upper side of the tooth of a saw.

The opposite side of the member 13' is formed with a plurality of rack teeth 16 which intermesh with teeth 17 formed on the inner end of the pivotal handle 11.

An adjusting screw 18 is threaded in the handle 1 in a position to engage the handle 11 to limit its movement. By adjusting this screw the throw of the block 13' is limited and thus the angle of bend of the saw tooth 19 is regulated.

In the use of this tool, which is of the size and shape of a pair of pliers, the jaw members 3 and 4 are spaced apart a slightly greater distance than the normal saw to be set. The jaw end is slipped over the blade of the saw and with the handle 11 depressed the anvil block 13' lifts to the position illustrated in Figure 1.

The tool is then manipulated to bring the saw tooth to be set into the notch 14. The handle 11 is then squeezed upwardly so that the rack teeth on the end engage the rack of the block 13' and the bevelled anvil portion 15 presses downwardly on the tool, bending it sharply against the edge of the lower jaw 4. The amount of bend will be regulated by the setting of the screw 18 to limit the movement of the handle 11.

With a tool such as described it will be readily appreciated a workman can manipulate the tool very rapidly, moving it from tooth-to-tooth and setting the teeth with a uniform angular bend.

A tool such as described is very simple and rugged and may be operated indefinitely without damage. The tool may be forged or may be of cast material.

What I claim as my invention is:

1. A saw set comprising a handle having a rectangular extension therefrom and an extension jaw, a second rectangular extension projecting from said handle and spaced from the aforesaid handle and having an extension jaw spaced from the aforesaid jaw and arranged parallel therewith, rectangular openings in each of said rectangular portions of said handle member arranged in alignment transversely across the opening between the jaw members, a rectangular anvil block slidably mounted in said guideways having a notch adapted to receive the tooth of the saw inserted between the jaws and formed with a bevelled anvil surface to engage and bend the tooth, a handle pivotally mounted having a toothed end extending into said guideway said slidable block having teeth to engage in operating contact with said pivotal handle to slide the anvil block, and means for gauging the movement of the pivotal handle.

2. A saw set comprising a handle having a pair of spaced parallel extensions, jaw portions extending parallelly from said extensions and spaced to receive the blade of a saw therebetween, guide openings extending through said spaced extensions and ranged in alignment transversely across the opening between said jaw portions, an anvil block slidably mounted in said guide openings having a notch intermediate its length adapted to receive the tooth of the saw inserted between the jaw portions and formed with a bevelled anvil surface to engage and bend the tooth, a handle pivoted to one of said extensions and operatively engaging said anvil block to slide same longitudinally in said guide openings, and means for gauging the movement of the pivotal handle.

JOSEPH W. MELANSON.

REFERENCES CITED

The following references are of record in the file of this patent:

UNITED STATES PATENTS

| Number | Name | Date |
|---|---|---|
| 96,156 | Sloat | Oct. 26, 1869 |
| 972,497 | Benjamin | Oct. 11, 1910 |
| 1,077,573 | Wolfe | Nov. 4, 1913 |
| 1,333,828 | Bohlender | Mar. 16, 1920 |
| 1,378,650 | Bodmer | May 17, 1921 |
| 1,774,039 | Rogers | Aug. 26, 1930 |
| 1,928,975 | Felsman | Oct. 3, 1933 |
| 2,289,114 | Frizzell | July 7, 1942 |